July 9, 1963  H. M. McKAY  3,096,993
TRUCK TRAILER WITH SHIFTABLE RUNNING GEAR FOR LOAD EQUALIZING
Filed Oct. 6, 1961  5 Sheets-Sheet 1
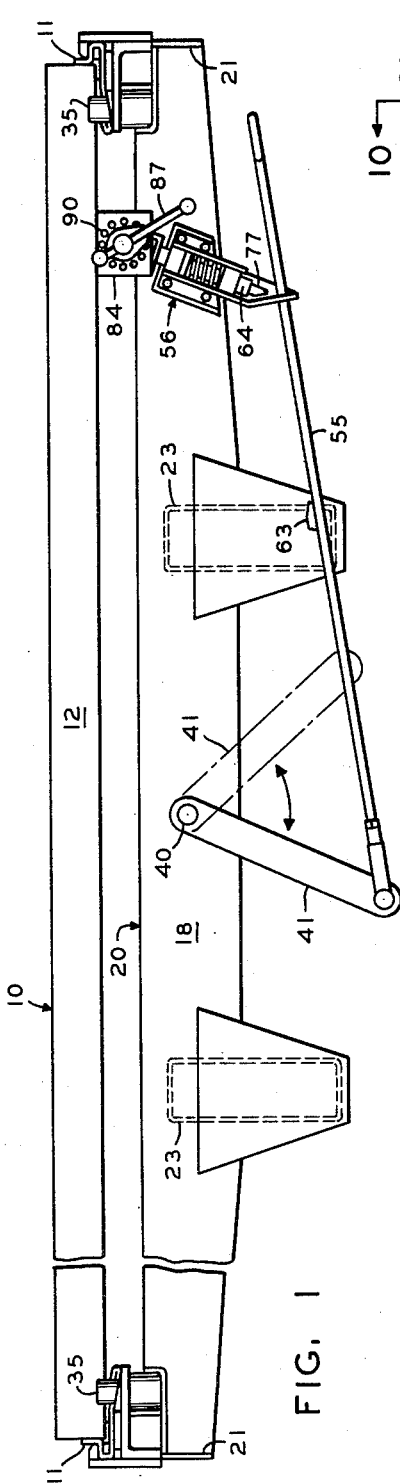
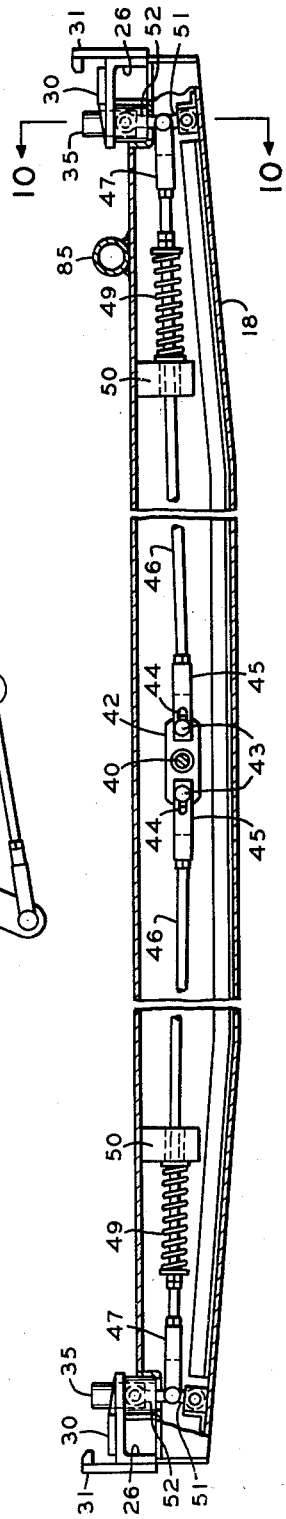
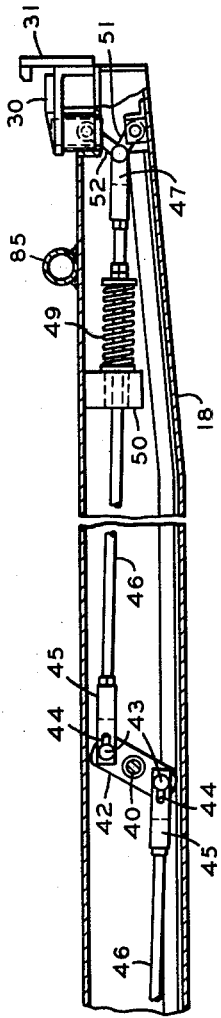
INVENTOR
HARRY M. McKAY
BY Cohn and Powell
ATTORNEYS

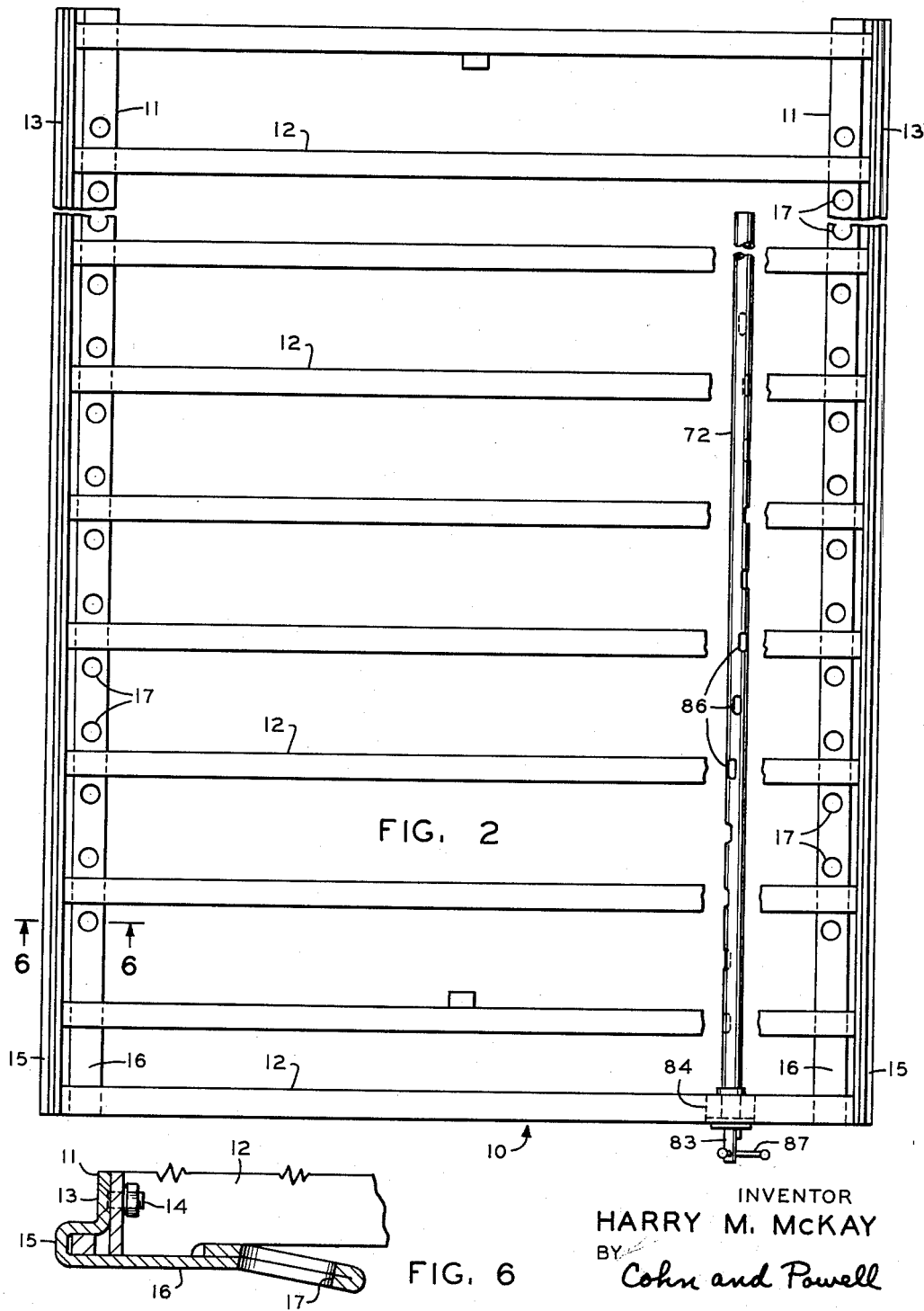

July 9, 1963            H. M. McKAY            3,096,993

TRUCK TRAILER WITH SHIFTABLE RUNNING GEAR FOR LOAD EQUALIZING

Filed Oct. 6, 1961            5 Sheets-Sheet 3

INVENTOR
HARRY M. McKAY
BY *Cohn and Powell*

ATTORNEYS

July 9, 1963            H. M. McKAY            3,096,993
TRUCK TRAILER WITH SHIFTABLE RUNNING GEAR FOR LOAD EQUALIZING
Filed Oct. 6, 1961
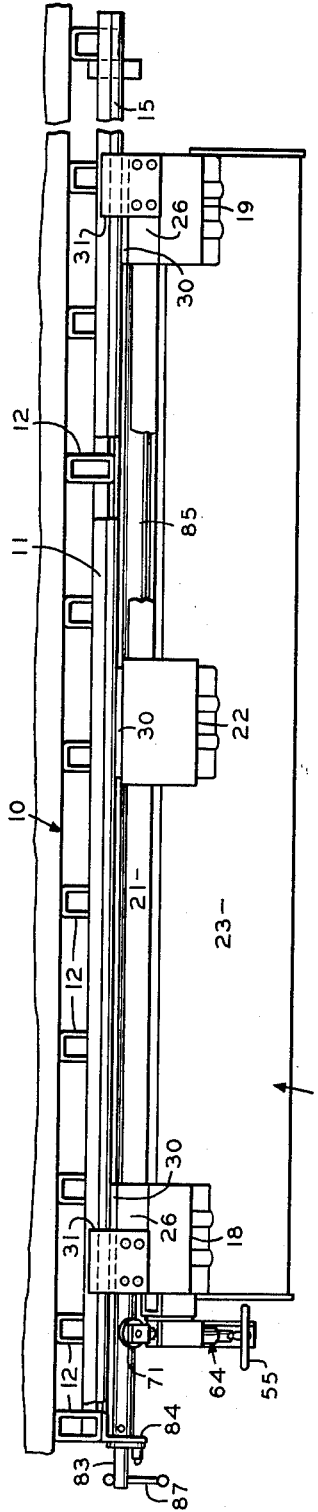
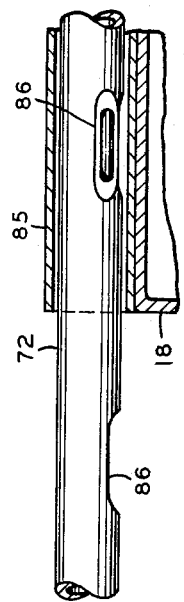
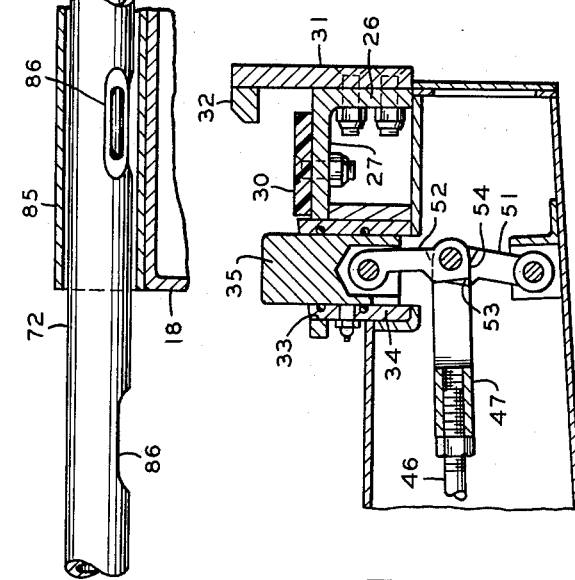
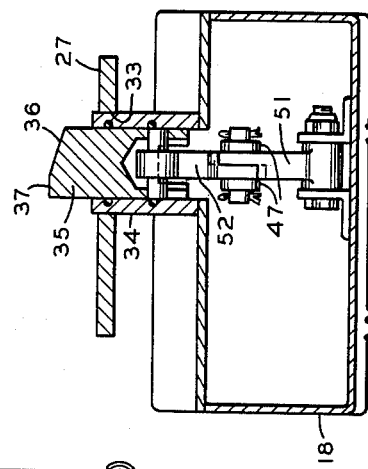
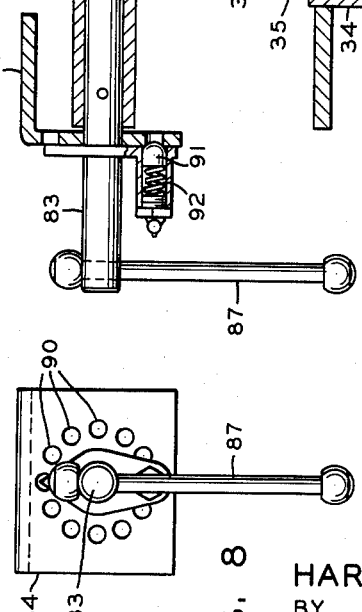
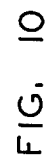
INVENTOR
HARRY M. McKAY
BY Cohn and Powell
ATTORNEYS

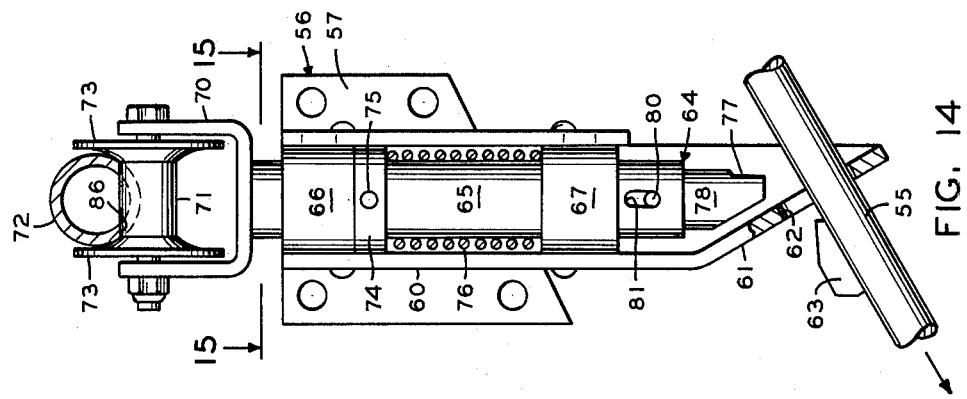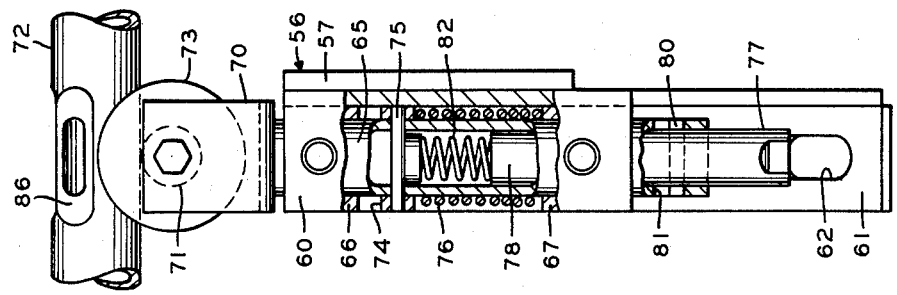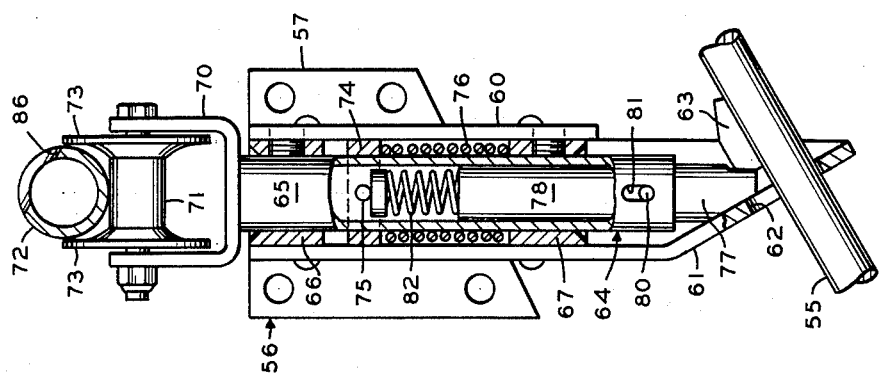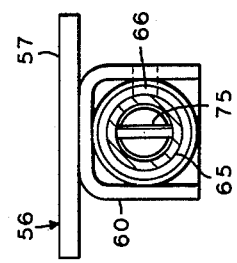
INVENTOR
HARRY M. McKAY
BY Cohn and Powell
ATTORNEYS

United States Patent Office 3,096,993
Patented July 9, 1963

3,096,993
TRUCK TRAILER WITH SHIFTABLE RUNNING GEAR FOR LOAD EQUALIZING
Harry M. McKay, Warrenton, Mo., assignor to The Binkley Company, Warrenton, Mo., a corporation of Missouri
Filed Oct. 6, 1961, Ser. No. 143,463
10 Claims. (Cl. 280—81)

This invention relates generally to improvements in a truck trailer with shiftable running gear for load equalizing, and more particularly to an improved mechanism for adjusting the position of the rear wheels of a trailer in order to equalize the load on the wheels.

An important object is to provide a locking means that enables the wheel truck to be locked selectively to the trailer body in different adjusted positions. Other important advantages are realized in providing means for releasing the lock and for automatically re-engaging the same when the wheel truck and body have been moved to a predetermined relative position.

Another important object is achieved by the provision of improved means for determining the relative position of the wheel truck and trailer body at which they are automatically locked. This preselector lock means is constructed so that it can be quickly and easily adjusted and set by anyone with only a minimum of instruction.

Still another important object is afforded by rotatively mounting a shaft of the preselector lock means on the body frame so that any one of a plurality of recesses formed in the shaft can be selectively located in a predetermined position in order to receive a follower engaging the shaft upon relative movement of the wheel truck and body frame in either direction of movement, whereby to release a manipulating means at a predetermined position of the truck relative to the frame, the manipulating means acting automatically upon release to urge locking pins on the truck into cooperating sockets provided in the body frame for positive interconnection.

Yet another important object is realized by the mounting and structural arrangement of the latch constituting a component part of the preselector assembly which enables a portion of the latch to yield resiliently upon engagement with the manipulating means and yet effect latching of the manipulating means in one position whereby to hold the locking pins selectively out of the body frame sockets, and which enables the latch to move in a direction upon entry of the follower into a preselected recess to cause release of the manipulating means for the purpose mentioned previously.

Another important object is achieved by the structural interconnection of the component parts constituting the latch means, and the arrangement and connection of such latch means with the preselector shaft and with the manipulating means. Specifically, the latch means includes a first plunger member reciprocatively mounted on the truck, and a follower attached to the first plunger member which engages the preselector shaft upon relative fore and aft movement of the truck and body frame. A second plunger member is reciprocatively mounted in the first plunger member and is movable relatively to an extended limit. A first resilient means urges the plunger members as a unit in a direction to move the follower into a preselected recess, while a second resilient means tends to urge the second plunger member to its extended limit. The second plunger means automatically engages the manipulating means as it is moved to a first position in which the truck and body frame are unlocked, while the follower is located out of the preselected recess. Upon entry of the follower into the preselected recess, the plunger members as a unit are moved in a direction to release the manipulating means for movement to a second position in which the body frame and truck are locked together.

It is an important object to provide a load equalizer that is simple and durable in construction, economical to manufacture, efficient in operation, and which is substantially automatic.

The foregoing and numerous other objects and advantages of the invention will more clearly appear from the following detailed description of a preferred embodiment, particularly when considered in connection with the accompanying drawings, in which:

FIG. 1 is a front end elevational view of the wheel truck and body frame;

FIG. 2 is a top plan view of the trailer body frame, partially broken away to show the preselector shaft;

FIG. 4 is a cross sectional view of the wheel truck as seen along line 4—4 of FIG. 3, the locking pins being shown in extended locking position;

FIG. 5 is a fragmentary cross sectional view similar to FIG. 4, but showing the locking pins retracted out of locking position;

FIG. 6 is an enlarged cross sectional view of one side rail of the body frame shown in FIG. 2;

FIG. 7 is a side elevational view of the wheel truck and body frame as seen from the right of FIG. 1;

FIG. 8 is an enlarged end elevational view of the crank for the preselector mechanism shown in FIG. 7;

FIG. 9 is a side elevational view, partly in cross section, of the preselector mechanism shown in FIG. 8;

FIG. 10 is an enlarged cross sectional view of the locking pin as seen along line 10—10 of FIG. 4;

FIG. 11 is a cross sectional view of the locking pin as seen in a vertical plane at right angles to FIG. 10;

FIG. 12 is an enlarged front elevational view of the latch mechanism, partially broken away and illustrated in cross section;

FIG. 13 is a side elevational view of the latch mechanism shown in FIG. 12, partially broken away and illustrated in cross section;

FIG. 14 is a front end elevational view of the latching mechanism, similar to FIG. 12, but showing the manipulating means released; and FIG. 15 is a cross sectional view of the latch mechanism as seen along line 15—15 of FIG. 14.

Figure 3:
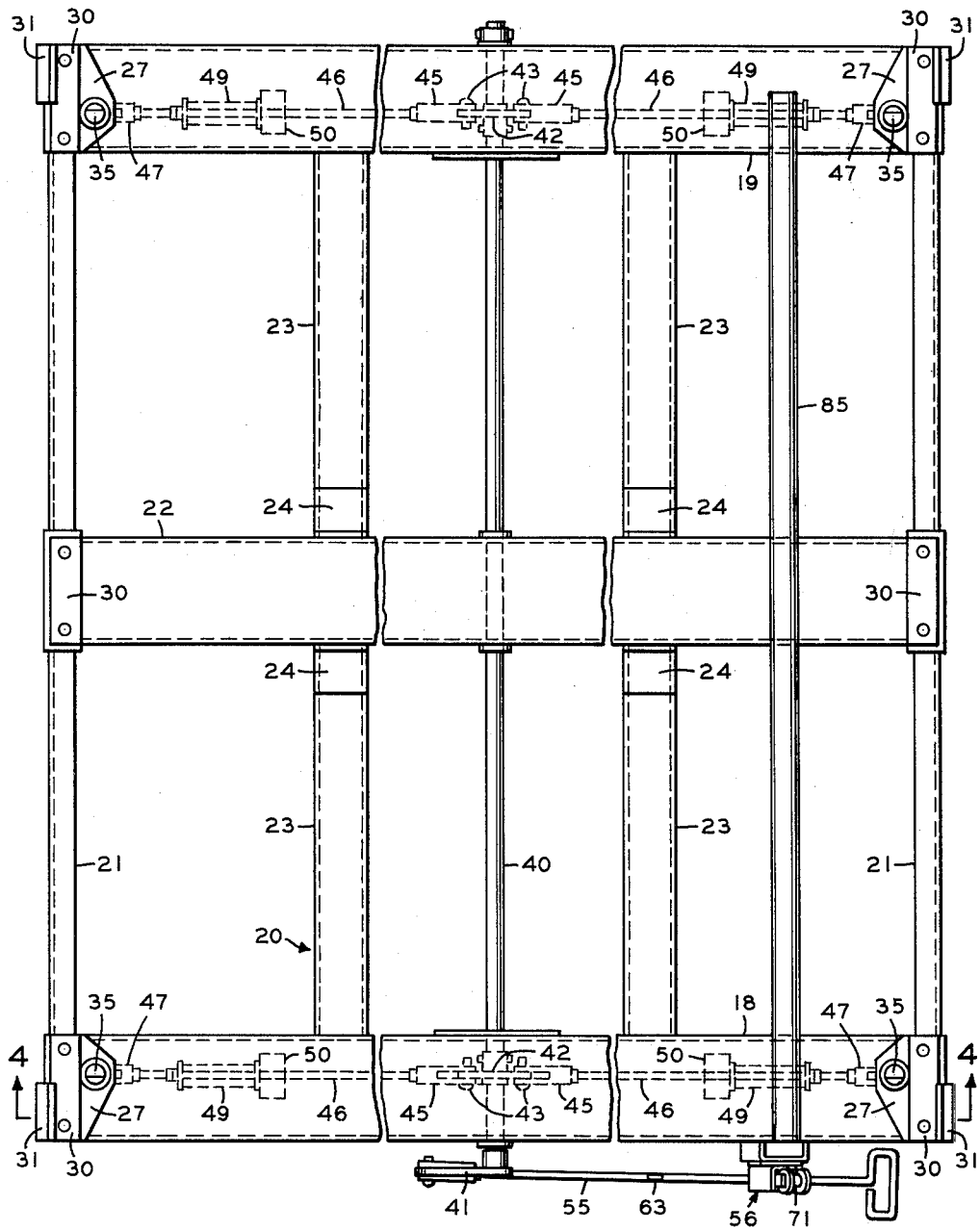
FIG. 3 is a top plan view of the wheel truck.

Referring now by characters of reference to the drawings, and first to FIG. 1, the body frame generally indicated at 10 is secured to the underside of the trailer body (not shown). The body frame 10 includes a pair of parallel spaced side rails 11 located at the bottom of the sides of the trailer body. These elongate side rails 11 are interconnected by a plurality of cross braces 12. As is best seen in FIG. 6, each side rail 11 includes a vertical portion 13 attached by bolts 14 to the ends of cross braces 12, an outwardly extending reverse portion forming a horizontal lip 15, and an inwardly extending, substantially horizontal plate portion 16. Formed in the horizontal plate portion 16 of side rail 11 are a plurality of longitudinally spaced and aligned locking pin sockets 17.

It will be noted that this particular structural arrangement of the body frame provides a substantially flat base for the trailer body for its entire width, thereby enabling the trailer body to seat firmly on any flat supporting subjacent surface such as a railway flat car.

The wheel truck referred to at 20 includes a pair of parallel spaced side members 21 constructed usually of U-shaped channel forms and arranged so that their open ends face each other, these side members 21 are rigidly interconnected by three cross braces 18, 19 and 22 usually constructed of a box section. One of these cross braces 18 and 19 is located at each end of the side members 21, while the third cross brace 22 is located intermediate of such ends.

Extending between each of the end cross braces 18 and 19 and the intermediate cross brace 22 are a pair of sills 23, the sills 23 being attached by gusset plates 24. The wheels of the wheel truck frame 20 are located within and between the side members 21.

Secured to the top of each end of the front and rear cross braces 18 and 19 is a bolster member 26. Each bolster member 26 includes a substantially horizontal plate portion 27 extending inwardly and located immediately below the side rails 11 of the body frame 10. Attached to the horizontal plate portion 27 is a bearing slide block 30 adapted to support the horizontal plate portion 16 of the associated side rail 11.

A hold-down plate 31 is detachably secured to the side of each bolster member 26, the hold-down plate 31 including a hook formation 32 adapted to overlap the outwardly extending lip 15 on the associated side rail 11. The hold-down plates 31 act to retain the body frame 10 in operative connection with the wheel truck 20. The hold-down plates 31 engage the side rails 11 and prevent lateral shifting or displacement of the trailer body relative to the wheel truck 20, yet permit relative sliding movement of the body frame and wheel truck in a fore and aft direction. It is seen that if it is desired to remove the trailer body from the wheel truck 20, the hold-down plates 31 are simply detached and the trailer body including the body frame 10 can be lifted off of the wheel truck 20 and placed on another type of transport carrier such as a railway flat car or onto another wheel truck.

Each of the bolster members 26 includes a circular aperture 33 adapted to receive and position a cylindrical tubular sleeve 34, constituting a guide means, for a reciprocatively mounted locking pin 35. The sleeve 34 is secured to its associated bolster plate portion 27 and to the top of the associated cross brace 18 or 19 as is best seen in FIG. 11. The locking pins 35 are mounted for vertical reciprocation and are located so as to be received in any one of the cooperating sockets 17 provided in the overlying associated side rail 11.

To avoid the possibility of overshooting the positions of the pins 35, each pin 35 is formed at the end engaging the socket with a bevelled face 36 which, as is best seen in FIG. 10, is positioned at an angle with a plane normal to the axis of the pin. Preferably a small area of the end of the pin is left perpendicular to the axis as is indicated at 37 so as to provide a bearing surface when engaging the underside of the side rail 11.

This shape of pin 35 facilitates the entrance of the pin into its socket. When the side rail 11 is moved relatively to the truck frame, the side rail 11 will slide along the end of the pin 35 until the next socket 17 comes opposite such pin, at which point the end portion 37 of the pin will easily enter the socket since its cross section is reduced with respect to that of the body of the pin. Accordingly, the pin 35 may start to enter the socket 17 before the socket is completely in alignment with the pin, and if the motion is relatively fast, rail 11 will be stopped by pin 35 and prevented from overshooting. The bevelled faces 36 of the locking pins 35 are faced in opposite directions at the two ends of the truck frame so that the pins at one end will prevent overshooting in one direction, while those at the other end will perform the same duty when the movement is in the opposite direction.

The wheel truck has mounted thereon at each end thereof on the cross braces 18 and 19, a locking mechanism as is illustrated in FIGS. 3 and 4. As these mechanisms are identical at the two ends of the wheel truck, only one of them need be described.

A shaft 40 extends longitudinally of the wheel truck 20 and is journalled at its ends in the front and rear cross braces 18 and 19. Secured to one end of shaft 40 is a lever 41 located in front of the cross brace 18 and shown in FIGS. 1 and 3.

Located within the cross brace 18 and secured to shaft 41 is a double bell crank 42. The crank 42 carries two crank pins 43 equally spaced on opposite sides of the axis of shaft 40. Connected to each pin 43 by means of a slot 44 in which the pin 43 is movable, is a yoke 45. A lock rod 46 is attached to each yoke 45 and is attached at the opposite end to a similar yoke 47, the rod being slidably supported intermediately by a bracket 50. The yoke 47 is pivotally connected to a pair of toggle arms 51 and 52, one of the arms being pivotally supported to the cross brace 18 while the other arm 52 is pivotally connected to a locking pin 35. The toggle arms 51 and 52 are arranged so that when folded by the lock rod 46, the locking pin 35 is retracted out of its cooperating socket 17, and conversely, when the toggle arms 51 and 52 are extended, the locking pin 35 is vertically raised into its socket 17.

The detailed structure of the toggle arms 51 and 52 is best shown in FIGS. 10 and 11. These toggle arms 51 and 52 are provided respectively with stop shoulders 53 and 54 that interengage to retain the toggle arms in an extended over-center position shown in FIG. 11. Any vertical load exerted on locking pin 35 and transmitted to the toggle arms 51 and 52 will not cause any collapse of the toggle arms, and thereby will not cause any retraction unintentionally of the locking pin 35. To retract the locking pin 35, the toggle arms 51 and 52 must be positively broken or pulled back from the over-center position, and then folded under the pulling action of lock rod 46.

A compression spring 49 is located about each of the lock rods 46, one end of spring 49 engaging an abutment on the rod 46 while the other end engages the bracket 50. The springs 49 constitute resilient means tending to urge the lock rods 46 in a direction so as to extend the toggle arms 51 and 52, and hence extend the locking pins 35 into locking engagement with their associated sockets 17 formed in side rails 11.

The slots 44 provide a lost motion between the yokes 45 and pins 43 so that in case all of the locking pins 35 do not come into alignment with their sockets 17 simultaneously, each one may enter its own socket individually when that socket does come into alignment. As there are four locking pins 35, a four-fold lock is provided.

Pivotally attached to the other end of lever 41 is a lock handle 55 constituting a part of the manipulating means, the handle 55 extending laterally outward to one side of the wheel truck 20.

As is best seen in FIGS. 12–15 inclusive, a bracket indicated at 56 includes a back plate 57 fixed to the front wall of the forwardmost cross brace 18. Further, the bracket 56 includes a substantially U-shaped channel 60 extending substantially vertical, the channel 60 constituting a guide plate. An inclined bottom wall 61 is formed integrally with one of the side walls and the web wall of the channel 60. The inclined wall 61 is provided with an aperture 62 constituting a guide means adapted to receive the trip handle 55. The trip handle 55 is constrained by the bracket 56 to slidable operation in a vertical plane at a right angle to the direction of relative movement of body frame 10 and wheel truck 20.

A catch abutment 63 is formed on the trip handle 55. The catch abutment 63 being adapted to slide through the bracket aperture 62 upon actuation of the handle 55 incident to locking and unlocking the pins 35.

The control means for determining the relative position at which body frame 10 and wheel truck 20 are interlocked, includes a preselector latch referred to at 64. This latch 64 includes an elongate tubular plunger member 65 reciprocatively mounted in spaced bearings 66 and 67 atatached to and within the bracket channel 60.

Attached to the upper end of the tubular member 65 is a bifurcated yoke 70. A roller 71 constituting a follower is rotatively mounted within the yoke 70 on an axis disposed transversely to the longitudinal axis of a preselector shaft 72, the details of which will be described subsequently. Preferably, the roller 71 is provided with end flanges 73 that embrace the sides of the preselector shaft 72.

A collar 74 is disposed about the tubular member 65, and is located within the bracket channel 60 between the vertically spaced bearings 66 and 67. The collar 74 is fixed to the tubular member 65 by a transverse pin 75. A compression spring 76 constituting a resilient means is disposed about the tubular member 65 within the bracket channel 60. One end of compression spring 76 engages the collar 74 while the other end engages the lowermost bearing 67. The spring 76 tends to urge the tubular member 65 upwardly and tends to urge the roller 71 against the preselector shaft 72.

Reciprocatively mounted within the tubular member 65 is a bolt member 78 constituting a plunger. The lowermost end 77 of bolt member 78 extends out of the open bottom end of tubular member 65. A pin 80 fixed to and carried transversely of the bolt member 78 is slidably received in a short slot 81 formed in opposite sides of the tubular members 65. Movement of pin 80 in the slots 81 determine the retracted and extended limits of bolt member 76.

Another compression spring 82 is located within the tubular member 65, one end of such spring 82 engaging the rear end of bolt member 76 while the opposite end reacts against the transverse pin 75. The compression spring 82 tends to urge the bolt member 76 to its extended limit.

The previously mentioned preselector shaft 72 is tubular and is carried at its front end by the body frame 10. The rear end of shaft 72 is not attached to body frame 10, but rather is allowed to float free relative to such frame 10. More particularly, the preselector shaft 72 extends longitudinally in the direction of movement of the body frame and extends across the braces 12. The front end of tubular shaft 72 is pinned to a stub shaft 83 inserted internally of such shaft 72. The stub shaft 83 is rotatively mounted in a plate 84 that is attached to the forwardmost cross brace 12.

The shaft 72 is provided with a plurality of recesses 86 spaced longitudinally along the shaft and arranged in angular relation. In the embodiment disclosed, there are a total of 12 recesses 86 arranged in regularly spaced 30 degrees relation.

Secured as by welding to the wheel truck 20 is a guide tube 85 that extends longitudinally between the cross braces 18 and 19. The preselector shaft 72 is telescopically disposed in guide tube 85 and is slidably guided therein during adjustment of the relative positions of the body frame 10 and wheel truck 20. Because unbalanced loading of the trailer may cause deflection of shaft 72 if its rear end were fixed to the body frame 10, and thereby possibly cause misalignment with the latch 64 so that the preselected recess 86 may not engage the roller for locking, the rear end of shaft 72 floats free in tube 85 and avoids these disadvantages. The tube 85 has sufficient clearance with shaft 72 to prevent any binding or deflection of shaft 72.

The shaft 72 is located directly above the roller 71 so that any one of the recesses 86 can be brought into the vertical plane of roller 71 and more particularly into the path of travel of the roller 71. Attached to the front end of stub shaft 83 is a crank 87 that the operator can manipulate to rotate the shaft 72 in order to place a preselected recess 86 in the path of travel of the roller 71. Formed in plate 84 are a plurality of apertures 90 arranged in regularly spaced relation in a circular row about the axis of shaft 72. There are the same number of apertures 90 as there are recesses 86.

A plunger 91 is carried by a plate 92 fixed to the stub shaft 83 immediately adjacent the front face of plate 84. A spring 92 engages the plunger 91 and tends to urge the plunger 91 into any one of the apertures 90. Depending upon the aperture 90 into which the plunger 91 is located, an appropriate recess 86 is selected to be disposed in the path of travel of the roller 71.

It is thought that the operation and functional advantages of the load equalizer have become fully apparent from the foregoing detailed description of parts, but for completeness of disclosure the operation of the preselector mechanism will be briefly described. It will be assumed that the locking pins 35 interengage socket 17 and that the body frame 10 is thereby attached to the wheel truck 20, and that it is desired to change the relative position of the body frame relative to the wheel truck in order to equalize the load of the trailer on the wheels.

First, the operator rotates the shaft 72 by turning the crank 87 until an appropriate preselected recess 86 is located vertically in the path of travel of the roller 71. The appropriate recess 86 is selected by locating the plunger 91 into a corresponding selector plate aperture 90, the plunger 91 acting to retain the shaft 72 in adjusted position.

Then, the operator grips the lock handle 55 and pulls it outwardly from the position shown in full lines in FIG. 1. This action of the handle 55 swings the lever 41 from the position shown in full lines in FIG. 1 to the position shown in broken lines, and rotates the double bell cranks 42 from the position shown in FIG. 4 to the position shown in FIG. 5. As the double bell cranks are rotated, the lock rods 46 fold the toggle arms 51 and 52 to retract the locking pins 35 out of the sockets 17.

In addition, as the lock handle 55 is pulled outwardly, the catch abutment 63 engages the lower plunger end 77 of the bolt member 78 as the abutment 63 passes through the guide plate aperture 62. It will be assumed that upon rotating the shaft 72 to position a preselected recess 86, that the roller 71 has been moved out of its previous recess and that the roller 71 now rides on the periphery of such shaft 72 as is shown in FIG. 12. Under these circumstances, the tubular member 65 is moved downwardly to the position illustrated, and the bolt member 78 is extended relative to the tubular member 65 under the action of spring 82 so that the plunger end 77 engages the inclined wall 61 and overlaps a portion of the aperture 62.

The catch abutment 63 is moved from the left-hand side (FIG. 12) of bolt member 76 to the right-hand side, the end 77 of the bolt member 76 riding up on the camming margin of the abutment 63, and the bolt member 76 moving to a retracted position against the loading of spring 82. As soon as the lower plunger end 77 of the bolt member 78 rides over the catch abutment 63, it drops into position in front of the aperture 62 and in back of the catch abutment 63. Specifically, the plunger end 77 of bolt member 78 is wedged between the inclined wall 61 and catch abutment 63, thereby maintaining the manipulating means in a position so that the body frame and wheel truck are disconnected.

A simple movement of the trailer body by means of the tractor in the required direction will cause the preselected recess 86 to be moved into alignment with the roller 71. More particularly, roller 71 will interfit the preselected recess 86, thereby causing the tubular member 65 and the bolt member 78 to raise as a unit under the action of spring 76 to the position illustrated in FIG. 14. In this position, the plunger end 77 of bolt member 78 is raised clear of the catch abutment 63.

Immediately, the handle 55 is released, and the springs 49 operate to move the rods 46 in a direction to expand the toggle arms 51 and 52. Upon such expansion of toggle arms 51 and 52, the locking pins 35 are moved vertically into the appropriate sockets 17 in the side rails 11 of the body frame 10. Moreover, the springs 49 act to rotate the double bell cranks 42 from the position shown in FIG. 5 to the position shown in FIG. 4, and consequently act through lever 41 to move the handle 55 inwardly to the position shown in full lines in FIG. 1. The body frame 10 and the wheel truck 20 are now securely locked and the body is ready for travel.

The preselector mechanism and the manipulating means is now reconditioned for subsequent use as explained above.

Although the invention has been described by making detailed reference to a single preferred embodiment, such detail is to be understood in an instructive, rather than in any restrictive sense, many variants being possible within the scope of the claims hereunto appended.

I claim as my invention:

1. In a trailer of the character described, a body frame provided with locking pin sockets spaced therealong, a wheel truck movable along said frame, a locking pin on said truck, resilient means urging said pin toward locking engagement with one of said sockets, manipulating means operable to retract said pin from such engagement, a shaft rotatively mounted on and disposed lengthwise of said body frame, said shaft being provided with a plurality of recesses spaced longitudinally along and about said shaft, a latch for said manipulating means including a reciprocatively mounted plunger, a follower carried by said plunger, said follower engaging and riding along said shaft upon relative movement of the truck and frame to interfit one of said recesses so as to release said manipulating means, and means connected to said shaft for turning the shaft to place a preselected recess in the path of travel of said follower.

2. In a trailer of the character described, a body frame, a wheel truck movable longitudinally along said frame, locking means selectively interconnecting said frame and truck in a plurality of longitudinally adjusted positions, manipulating means operatively connected to said locking means, said manipulating means being movable to a first position and to a second position respectively to unlock and lock said locking means, a shaft rotatively mounted on and disposed longitudinally of said body frame, said shaft being provided with a plurality of recesses spaced longitudinally along and about said shaft, a latch means selectively movable into engagement with said manipulating means to retain the manipulating means in said first position, and a follower carried by said latch means, said follower engaging and riding along said shaft upon relative movement of said truck and frame, and means connected to said shaft for turning the shaft to place a preselected recess in a path of travel of said follower, said follower interfitting one of said recesses so as to release said manipulating means for movement to said second position.

3. In a trailer of the character described, a body frame, a wheel truck movable longitudinally along said frame, locking means selectively interconnecting said frame and truck in a plurality of longitudinally adjusted positions, manipulating means operatively connected to said locking means, said manipulating means being movable to a first position and to a second position respectively to unlock and lock said locking means, a shaft rotatively mounted on and disposed longitudinally of said body frame, said shaft being provided with a plurality of recesses spaced longitudinally along and about said shaft, a latch means including a plunger reciprocatively mounted on said truck, a follower carried by one end of said plunger and movable along said shaft upon relative movement of said truck and frame, means connected to said shaft for turning the shaft to place a preselected recess in the path of travel of said follower, means at the opposite end of said plunger selectively engaging the manipulating means to retain the manipulating means in said first position while the follower is located out of said recess, resilient means urging said plunger in a direction tending to move said follower into said recess, said means at the said opposite end of the plunger selectively disengaging from the manipulating means upon movement of the follower into said recess so as to release said manipulating means for movement to said second position.

4. In a trailer of the character described, a body frame, a wheel truck movable longitudinally along said frame, locking means selectively interconnecting said frame and truck in a plurality of longitudinally adjusted positions, manipulating means operatively connected to said locking means, said manipulating means being movable to a first position and to a second position respectively to unlock and lock said locking means, a shaft rotatively mounted on and disposed longitudinally of said body frame, said shaft being provided with a plurality of recesses spaced longitudinally along and about said shaft, a latch means including a plunger having telescopically related members, one of said members being reciprocatively mounted on said truck, a follower carried by said one member and movable along said shaft upon relative movement of said truck and frame, and means connected to said shaft for turning the shaft to place a preselected recess in the path of travel of said follower, the other telescopically related member selectively engaging the manipulating means to retain the manipulating means in said first position while the follower is located out of said recess, and resilient means urging said plunger in a direction tending to move said follower into said recess, the said other telescopically related member disengaging from said manipulating means upon movement of said follower into said recess so as to release said manipulating means for movement to said second position.

5. In a trailer of the character described, a body frame, a wheel truck movable longitudinally along said frame, locking means selectively interconnecting said frame and truck in a plurality of longitudinally adjusted positions, manipulating means operatively connected to said locking means, said manipulating means being movable to a first position and to a second position respectively to unlock and lock said locking means, a shaft rotatively mounted on and disposed longitudinally of said body frame, said shaft being provided with a plurality of recesses spaced longitudinally along and about said shaft, a latch means including a plunger reciprocatively mounted on said truck, a follower carried by one end of said plunger and movable along said shaft upon relative movement of said truck and frame, means connected to said shaft for turning the shaft to place a preselected recess in the path of travel of said follower, resiliently mounted means carried by the opposite end of the plunger, an abutment on said manipulating means camming said resiliently mounted means out of its path of travel as the manipulating means is moved to said first position while the follower is located out of said recess, said resiliently mounted means selectively snapping into engagement with said abutment to retain said manipulating means in said first position, said follower interfitting one of said recesses to disengage said resiliently mounted means from said abutment so as to release said manipulating means for movement to said second position.

6. In a trailer of the character described, a body frame, a wheel truck movable longitudinally along said frame, locking means selectively interconnecting said frame and truck in a plurality of longitudinally adjusted positions, manipulating means operatively connected to said locking means, said manipulating means being movable to a first position and to a second position respectively to unlock and lock said locking means, a shaft rotatively mounted on and disposed longitudinally of said body frame, said shaft being provided with a plurality of recesses spaced longitudinally along and about said shaft, a latch means including a plunger having telescopically related members, one of said members being reciprocatively mounted on said truck, a follower carried by said one member and movable along said shaft upon relative movement of said truck and frame, resilient means acting on the other telescopically related member, an abutment on said manipulating means camming the said other telescopically related member out of its path of travel as the manipulating means is moved to said first position while the follower is located out of said recess, the said other telescopically related member snapping into engagement with said abutment to retain said manipulating means in said first position, and means connected to said shaft for turning the shaft to place a preselected recess in the path of travel of said follower, said follower interfitting one of said recesses so as to disengage the said other telescopically related member from said abutment so as to release said manipulating means for movement to said second position.

7. In a trailer of the character described, a body frame, a wheel truck movable longitudinally along said frame, locking means selectively interconnecting said frame and truck in a plurality of longitudinally adjusted positions, manipulating means operatively connected to said locking means, said manipulating means being movable to a first position and to a second position respectively to unlock and lock said locking means, a shaft rotatively mounted on and disposed longitudinally of said body frame, said shaft being provided with a plurality of recesses spaced longitudinally along and about said shaft, a latch means selectively movable into engagement with said manipulating means to retain the manipulating means in said first position, a roller mounted on said latch means along a rotative axis disposed transversely of the longitudinal axis of said shaft, said roller being movable along said shaft on relative movement of said truck and frame, and means connected to said shaft for turning the shaft to place a preselected recess in the path of travel of said roller, said roller interfitting said preselected recess so as to release said manipulating means for movement to said second position.

8. In a trailer of the character described, a body frame, a wheel truck movable longitudinally along said frame, locking means selectively interconnecting said frame and truck in a plurality of longitudinally adjusted positions, manipulating means operatively connected to said locking means, said manipulating means being movable to a first position and to a second position respectively to unlock and lock said locking means, a shaft rotatively mounted on and disposed longitudinally of said body frame, said shaft being provided with a plurality of recesses spaced longitudinally along and about said shaft, a latch means including a first plunger member reciprocatively mounted on said truck, a follower carried by said first plunger member and movable along said shaft upon relative movement of said truck and frame, a second plunger member reciprocatively mounted on said first plunger member, means interconnecting said plunger members to constrain relative movement between extended and retracted limits, means connected to said shaft for turning the shaft to place a preselected recess in the path of travel of said follower, a first resilient means urging said plunger members in a direction to move said follower into said preselected recess, a second resilient means tending to urge said second plunger member to its extended limit, an abutment on said manipulating means camming said second plunger member from its extended limit as the manipulating means is moved to said first position while the follower is located out of said preselected recess, said second plunger member snapping to its extended limit into engagement with said abutment to retain said manipulating means in said first position, said plunger members being movable upon entry of said follower into said preselected recess so as to release said manipulating means for movement to said second position.

9. In a trailer of the character described, a body frame, a wheel truck movable longitudinally along said frame, locking means selectively interconnecting said frame and truck in a plurality of longitudinally adjusted positions, manipulating means operatively connected to said locking means, said manipulating means being movable to a first position and to a second position respectively to unlock and lock said locking means, a shaft rotatively mounted on and disposed longitudinally of said body frame, said shaft being provided with a plurality of recesses spaced longitudinally along and about said handle, a latch means including a tubular member reciprocatively mounted on said truck, a follower carried by one end of said tubular member and movable along said shaft upon relative movement of said truck and frame, means connected to said shaft for turning the shaft to place a preselected recess in the path of travel of said follower, a bolt member slidably received in said tubular member, means interconnecting said bolt and tubular members to constrain relative movement to retracted and extended limits, a first spring means about said tubular member tending to urge both members in a direction so as to move said follower into a preselected recess, a second spring means in said tubular member and engaging said bolt member tending to urge said bolt member to its extended limit, an abutment on said manipulating means camming said bolt member from its extended limit as the manipulating means is moved to said first position while the follower is located out of said preselected recesses, said bolt member snapping to its extended limit into engagement with said abutment after said abutment has passed said bolt member so as to retain said manipulating means in said first position, said tubular member and bolt member being movable upon entry of said follower into said preselected recess so as to release said manipulating means for movement to said second position.

10. In a trailer of the character described, a body frame provided with locking pin sockets spaced therealong, a wheel truck movable along said frame, a locking pin on said truck, resilient means urging said pin toward locking engagement with one of said sockets, manipulating means operable to retract said pin from such engagement, a shaft disposed lengthwise of said body frame and having one end portion rotatively mounted on said body frame, a guide tube disposed lengthwise of and fixed to said wheel truck, the other end of said shaft being telescopically related to said guide tube, said shaft being provided with a plurality of recesses spaced longitudinally along and about said shaft, a latch for said manipulating means including a reciprocatively mounted plunger, a follower carried by said plunger and movable along said shaft upon relative movement of the truck and frame to interfit one of said recesses so as to release said manipulating means, and means connected to said shaft for turning the shaft to place a preselected recess in the path of travel of said follower, said shaft and guide tube having clearance to preclude binding or deflection of the shaft in order to maintain alignment of the preselected recess with said follower.

References Cited in the file of this patent

UNITED STATES PATENTS

| | | |
|---|---|---|
| 2,586,900 | Alderman | Feb. 26, 1952 |
| 2,841,411 | Sheppard et al. | July 1, 1958 |
| 2,900,194 | De Lay | Aug. 18, 1959 |